(12) United States Patent
Scoca et al.

(10) Patent No.: US 7,738,318 B2
(45) Date of Patent: Jun. 15, 2010

(54) METHOD AND APPARATUS FOR FAULT-TOLERANT, CORRELATION SONAR PROCESSING

(75) Inventors: Anthony L. Scoca, Hicksville, NY (US); James G. Huber, North Babylon, NY (US); Jerry Gabriel Klein, Bellerose, NY (US)

(73) Assignee: Lockheed Martin Corporation, Bethesda, MD (US)

( * ) Notice: Subject to any disclaimer, the term of this patent is extended or adjusted under 35 U.S.C. 154(b) by 408 days.

(21) Appl. No.: 11/945,145

(22) Filed: Nov. 26, 2007

(65) Prior Publication Data

US 2008/0273423 A1 Nov. 6, 2008

Related U.S. Application Data

(60) Provisional application No. 60/867,721, filed on Nov. 29, 2006.

(51) Int. Cl.
*G01S 15/60* (2006.01)
(52) U.S. Cl. .......................... 367/91; 367/89
(58) Field of Classification Search ............. 367/89–91; 702/143
See application file for complete search history.

(56) References Cited

U.S. PATENT DOCUMENTS

| 4,244,026 A | * | 1/1981 | Dickey, Jr. ................. 702/143 |
| 5,315,562 A | * | 5/1994 | Bradley et al. ................ 367/89 |
| 5,422,860 A | * | 6/1995 | Bradley et al. ................ 367/89 |
| 7,133,327 B2 | * | 11/2006 | Zhu et al. ..................... 367/91 |

* cited by examiner

*Primary Examiner*—Ian J Lobo
(74) *Attorney, Agent, or Firm*—DeMont & Breyer, LLC (57) ABSTRACT

A system is disclosed that enables the use of an incomplete SONAR array matrix in a correlation SONAR system. An improvement is achieved through the generation of a correlation-array model matrix of hydrophone correlations, based on an independent estimate of the ship's velocity, such as from an inertial navigator. Meanwhile, estimates of the missing values are generated based on one or more values from the model matrix, an interpolation of values from the SONAR array matrix itself, or some combination thereof. Regardless of how the missing values are generated, the model matrix provides a basis for comparison with the SONAR array matrix, which is populated with the estimated values, wherein subsequent comparisons are made between successive iterations of the model matrix and the SONAR array matrix. By applying the disclosed technique, a correlation SONAR system with incomplete data is able to continue working, and in the presence of a greater number of hydrophone failures than before.

20 Claims, 10 Drawing Sheets

METHOD AND APPARATUS FOR FAULT-TOLERANT, CORRELATION SONAR PROCESSING

CROSS REFERENCE TO RELATED APPLICATIONS

The following is incorporated herein by reference:
(1) U.S. Patent Application Ser. No. 60/867,721, filed Nov. 29, 2006.

If there are any contradictions or inconsistencies in language between this application and the case that has been incorporated by reference that might affect the interpretation of the claims in this application, the claims in this application should be interpreted to be consistent with the language in this application.

FIELD OF THE INVENTION

The present invention relates generally to SONAR systems, and, more particularly, to correlation SONAR.

BACKGROUND OF THE INVENTION

SONAR (Sound Navigation And Ranging) is the generic name of the technology that is used to locate objects underwater. SONAR is used in marine, geological, and biological research, undersea mapping and navigation, and various commercial and military applications. Among its many uses, SONAR can accurately estimate the velocity of a sea-faring vessel.

It is known to apply signal correlation to SONAR technology to measure velocity. See, for example, U.S. Pat. No. 4,244,026 to Dickey and U.S. Pat. No. 5,315,562 to Bradley et al. These systems typically include a sonar source and multiple receivers (i.e., hydrophones), which have a known separation. The SONAR source directs sonic pulses towards the ocean floor, and the receivers detect echoes of those pulses. The velocity of the vessel is then calculated based upon the distance traveled by the vessel between the transmission and reception of a first pulse and a second pulse.

As discussed further below, correlation SONARS rely on selecting a best or maximum "correlation" either between hydrophones or pulses, for the determination of velocity. Maximum correlation occurs when the ray path of an initial SONAR transmission (from the transmitter to the ocean floor, etc., and back to a receiver) of a first detected pulse is equal to the ray path of a second SONAR transmission.

Correlation SONAR systems can be water or ground referenced, and Spatial or Temporal based. A water-referenced correlation SONAR uses echoes reflected from the water beneath a vessel, whereas a ground-referenced correlation SONAR uses echoes reflected from the ocean bottom. A correlation SONAR can also be both ground and water based in the sense of having both ground- and water-referenced modes of operation.

Spatial correlation SONAR calculates the velocity of a vessel by transmitting two or more pulses towards the ocean bottom, detecting echoes of the pulses on a typically planar two-dimensional array of hydrophones, determining which two hydrophones in the array correlate the best, and dividing the distance between those hydrophones by twice the time differential between the pulses. Peak correlation might take place between hydrophones, in which case an interpolation scheme is used to determine where the peak occurs.

Temporal correlation SONAR determines velocity by transmitting multiple pulses toward the ocean bottom and detecting echoes of the pulses at a hydrophone array. For a given pair of hydrophones, the system determines which two pulses correlate the best, and calculates velocity by dividing the fixed distance between the hydrophones by twice the time differential between the two correlated pulses.

Correlation SONAR systems have a reliability issue that has hitherto not been solved. In particular, serious performance degradation can occur or the system can be rendered inoperable in the event that there are failures in multiple hydrophone channels, where a "hydrophone channel" is defined herein as including a hydrophone and all associated cabling, signal routing, and processing of that hydrophone's output.

SUMMARY OF THE INVENTION

A consequence of multiple hydrophone channels having failed is that the correlation SONAR array matrix that is generated for the purpose of determining a velocity measurement ends up with missing correlation-product values. The present invention enables the use of the incomplete SONAR array matrix and, in the process, improves the availability of a ship's velocity measurements that are obtained from the correlation SONAR system. The improvement in the illustrative embodiment is achieved through the generation of a correlation-array model matrix of hydrophone correlations, based on an independent estimate of the ship's velocity, such as from an inertial navigator. Meanwhile, estimates of the missing values are generated based on one or more values from the model matrix, an interpolation of values from the SONAR array matrix itself, or some combination thereof. Regardless of how the missing values are generated, the model matrix provides a basis for comparison with the SONAR array matrix, which is populated with the estimated values, wherein subsequent comparisons are made between successive iterations of the model matrix and the SONAR array matrix. By applying the illustrative embodiment technique, a correlation SONAR system with incomplete data is able to continue working, and in the presence of a greater number of hydrophone failures than before.

The technique of the illustrative embodiment is summarized in more detail here. First, the system of the illustrative embodiment determines the health of each of its hydrophone channels. Second, the system generates a correlation SONAR array matrix based on the actual SONAR data received by the hydrophones, in well-known fashion, but with empty array positions for the hydrophone channels that have been detected as having failed. An element of the matrix represents the correlation between data from a first pulse in a hydrophone channel and a second pulse in the same or a different hydrophone channel. Third, the system generates a correlation-array model matrix of hydrophone correlations, based on an independent estimate of the ship's velocity. Fourth, the system fills in the empty positions in the SONAR array matrix with the estimated correlation values from the corresponding positions in the model matrix. Alternatively, the empty positions in the SONAR array matrix can be filled with values that have been interpolated from surrounding positions in the array itself (i.e., via a mathematical fill-in technique). Fifth, the system then compares the SONAR array matrix with the model matrix and computes a measure of difference (referred to as "cost" in matrix array theory). Subsequently, the system iterates on estimated velocity, generating a revised model matrix for each iteration and then comparing i) the SONAR array matrix, which comprises updated correlation-product estimates, with ii) the revised model matrix, until the cost is minimized. This "difference" between the compared arrays is thereby optimized, and a final velocity solution is developed based on the velocity estimate corresponding to the optimal correlation-array model matrix.

There are a number of benefits to being able to reliably estimate the velocity of a sea-faring vessel. One benefit is that a velocity estimation with greater availability results in improved estimates of a ship's position (when those estimates are velocity-based) for submerged vehicles (e.g., submarines, AUVs, UUVs, etc.). This is particularly important for submerged vehicles for which Global Positioning System (GPS) fixes are not available or otherwise kept to a minimum to maintain the ship's covertness. Another benefit of having high-availability velocity estimates is that they improve the accuracy of certain on-board missile-delivery systems that employ a technique to obtain a velocity fix, which is then provided as initialization data to the missile before launch. In other words, high-availability estimates reduce the missile Circular Error Probable (CEP).

The illustrative embodiment features a hydrophone-based array with hydrophones that provide signals on which fault tolerant, correlation SONAR processing can be performed. However, as those who are skilled in the art will appreciate, after reading this specification, alternative embodiments can be made and used in which a type of receiver other than a hydrophone is featured.

A method for fault-tolerant processing for a correlation SONAR system, in accordance with the illustrative embodiment of the present invention, comprises: receiving a first velocity estimate; generating a first correlation-array model that comprises a first plurality of estimated correlation products that are based on i) the first velocity estimate and ii) the relative positioning of receivers within a plurality of receivers; generating a correlation array that comprises a plurality of actual correlation products that are based on SONAR signals that are received by the receivers; and developing a second velocity estimate, based on a difference between i) the first correlation-array model and ii) the correlation array.

A velocity-measuring correlation SONAR system, in accordance with the illustrative embodiment of the present invention, comprises: a receiver array that comprises a plurality of hydrophones; means for developing a first velocity estimate independently of the plurality of hydrophones; means for generating a) a first correlation-array model that comprises a first estimated correlation product that is based on i) the first velocity estimate and ii) the relative positioning of the hydrophones, and b) a correlation array that comprises i) at least one actual correlation product that is based on SONAR signals that are received by the hydrophones and ii) a substitute array element that is based on the first estimated correlation product; and means for developing a second velocity estimate, based on a first difference between i) the first correlation-array model and ii) the correlation array.

DETAILED DESCRIPTION

Figure 1:
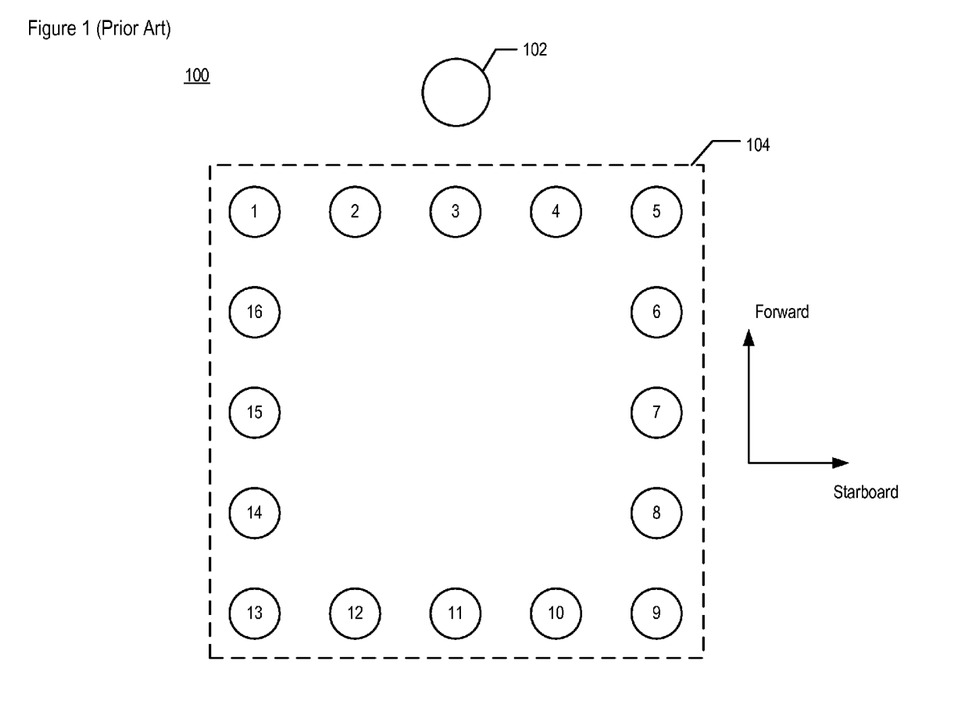
FIG. 1 depicts a schematic diagram of a prior-art, spatial correlation SONAR system for measuring velocity, system 100.

FIG. 1 depicts a schematic diagram of a prior-art, spatial correlation SONAR system for measuring velocity. SONAR system 100, which may be mounted on the underside of a ship, comprises transmitter 102 and receiver array 104. Receiver array 104 comprises receivers 1 through 16, wherein each receiver is commonly referred to as a "hydrophone." (The terms "receiver" and "hydrophone" are used interchangeably herein.)

In array 104, receivers 12, 11, and 10 are not normally used. That is, in the prior art, they are used only if there is a failure in other receivers in the array. The term "back-up," as used in this Specification and applied to hydrophones, refers to a hydrophone that is normally not used. In contrast, receivers 1-9 and 13-16 are, in fact, normally used. The term "prime," as used in this Specification and applied to hydrophones, refers to a hydrophone that is normally used. If a prime hydrophone fails, it can be replaced with a back-up hydrophone.

It will be clear to those skilled in the art, after reading this specification, how to make and use alternative embodiments in which there is a different combination of prime and back-up hydrophones than that depicted in FIG. 1, or only one type of hydrophone present (i.e., all "prime").

Figure 2:
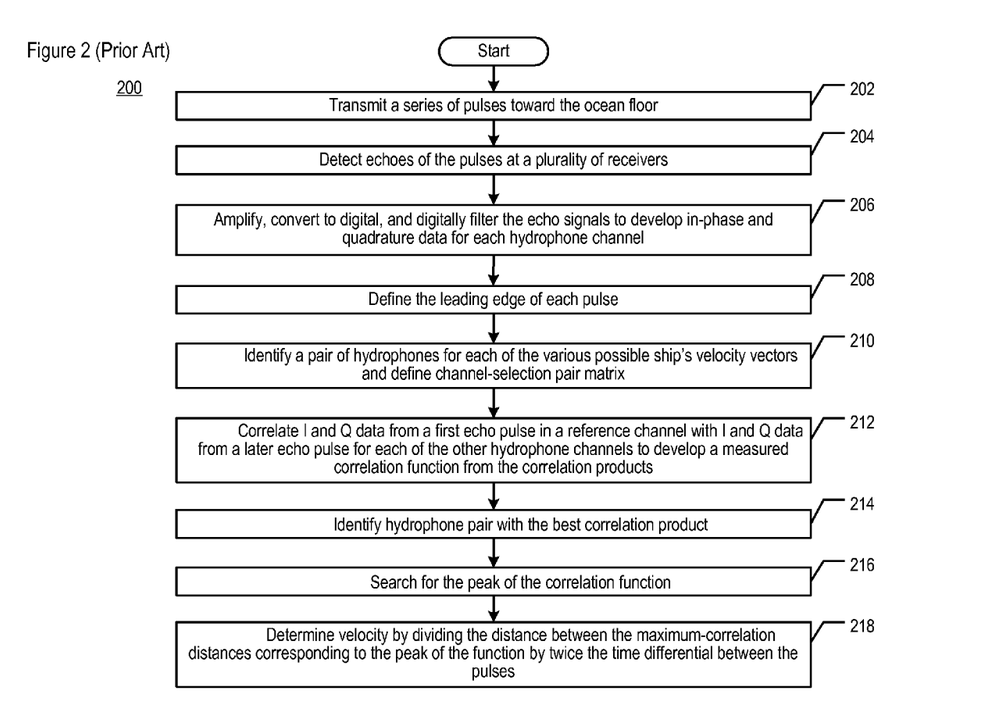
FIG. 2 depicts prior-art method 200 for velocity-measuring, spatial correlation SONAR processing.

FIG. 2 depicts prior-art method 200 for velocity-measuring, spatial correlation SONAR processing. In accordance with task 202 of prior-art method 200, a series of pulses are transmitted vertically towards the ocean bottom.

At task 204, echoes are detected at each prime hydrophone 1-9 and 13-16. For a ground-referenced correlation SONAR, the echoes are returned from the ocean floor. For a water-referenced correlation SONAR, the echoes are returned from the water volume beneath the ship.

At task 206, pulse echo data is amplified, converted from analog to digital, and then digitally filtered to yield in-phase ("I") and quadrature ("Q") data for each hydrophone channel. This I and Q data contains all of the amplitude and phase information contained in the echo pulses, but is base banded and thus vastly reduced in data rate from the A-to-D-converted echo signals.

In accordance with task 208, a pulse location algorithm is employed to define the leading edge of each pulse.

At task 210, a pair of prime hydrophones is identified for each of the ship's various possible velocity vectors, given the arrangement of receiver array 104. Redundant channels—those that have the same velocity (speed and direction) as an identified pair—are not used at this point. For example, if (1, 16) is identified as a receiver pair, then the following pairs would be considered redundant: (16, 15); (15, 14); (14, 13); (5, 6); (6, 7); (7, 8); and (8, 9). Furthermore, no pairing is made at this point for any back-up hydrophone, such as hydrophones 10 through 12. A channel-selection pair matrix, which includes all of the possible non-redundant ship's velocity vectors, is created.

At task 212, I and Q data from a first echo pulse in a reference channel is correlated with I and Q data from a later echo pulse for each of the other channels, thereby forming a correlation product for each channel-selection pair (i.e., receiver pair). These individual correlation products together describe a measured correlation function.

At task 214, the receiver pair having the best correlation product ("the best-correlated receiver pair") is identified.

In accordance with task 216, in the channel-selection pair matrix, an M-by-M array of receiver-pair correlation products is formed (e.g., M equals three, etc.), wherein the array is centered about the best-correlated receiver pair from task 214. A search for the peak of the correlation function is performed, which can possibly lie somewhere between the best-correlated receiver pair and another receiver pair in the M-by-M array. For example, an interpolation algorithm can be used on the correlation products, in order to find the location of the peak in relation to the receiver pairs.

The correlation function that is described by the correlation products and the peak is a relationship between the correlation between receiver pairs and their displacement in the x and y directions, where "x" and "y" correspond to the fore/aft and athwart-ship directions, respectively. The location of the correlation peak provides "maximum-correlation distance" components in the fore/aft and athwart-ship directions. The velocity is determined in task 218 by dividing the maximum-correlation distance for each directional component by twice the time differential between the pulses.

Method 200 can be repeated, periodically or sporadically, in order to provide updated determinations of velocity.

Figure 3:
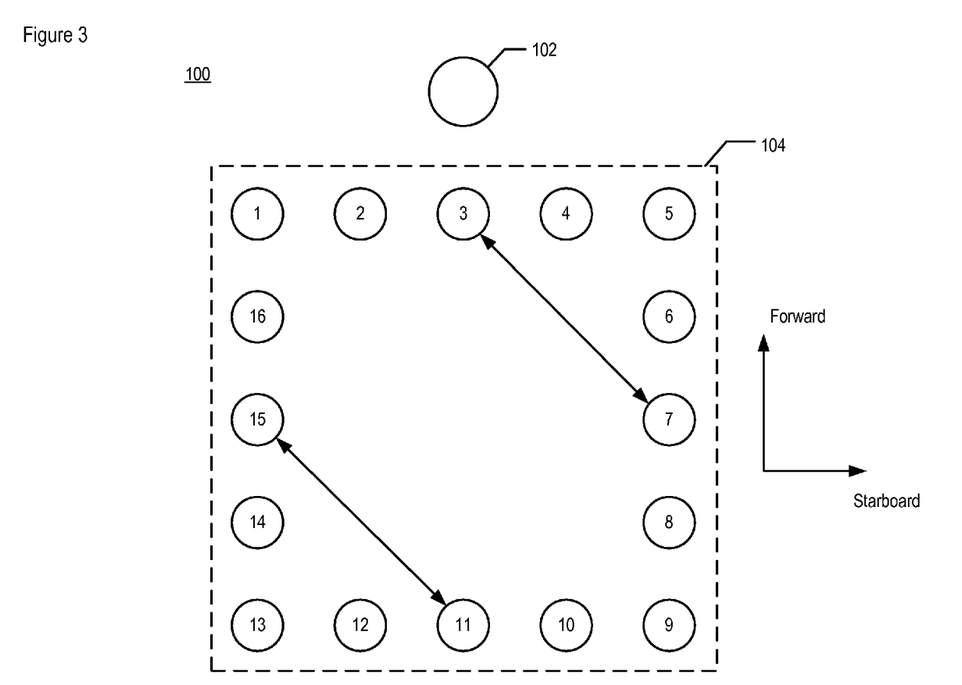
FIG. 3 depicts SONAR system 100, in which the velocity vector represented by hydrophone pair (3,7) can alternatively be represented by hydrophone pair (15,11).

When a hydrophone fails in a hydrophone pair, another pair of hydrophones can be used to represent (i.e., "cover") the same velocity vector as the first pair, provided that another hydrophone pair is available. For example, FIG. 3 depicts SONAR system 100, in which the velocity vector represented by receiver pair (3,7) can alternatively be represented by receiver pair (15,11). Although receiver 11 is one of the back-up hydrophones, it can be made active when needed, such as when one of the hydrophones in receiver pair (3,7) fails.

Figure 4:
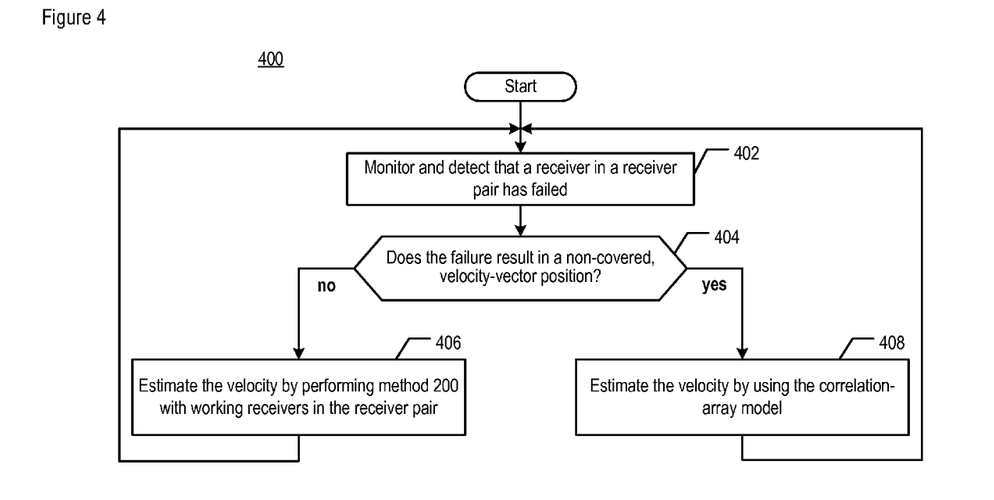
FIG. 4 depicts method 400 for determining when to use the velocity-measuring technique of the illustrative embodiment.

FIG. 4 depicts method 400 for determining when to use the velocity-measuring technique of the illustrative embodiment. As those who are skilled in the art will appreciate, at least some of the tasks depicted in FIG. 4 can be performed simultaneously or in a different order than that depicted. Furthermore, it will be clear to those skilled in the art, after reading this specification, how to make and use alternative embodiments in which the illustrative embodiment technique is invoked under different circumstances than that represented in FIG. 4.

At task 402, a receiver is detected as having failed. Several techniques exist in the prior art that can be used to detect a receiver failure.

At task 404, a determination is made as to whether the failed receiver results in a velocity-vector position in the channel-selection matrix as no longer being covered. If not (i.e., the position is still covered), then task execution proceeds to task 406. Otherwise, (i.e., the position is no longer covered), task execution proceeds to task 408.

At task 406, method 200 is performed using another receiver pair in place of the pair that comprises the failed receiver. Task execution then proceeds back to task 402, in order to keep monitoring for receiver failures.

At task 408, the velocity-measuring technique of the illustrative embodiment is performed, as described in detail below and with respect to FIG. 5. Task execution then proceeds back to task 402, in order to keep monitoring for receiver failures.

Figure 5:
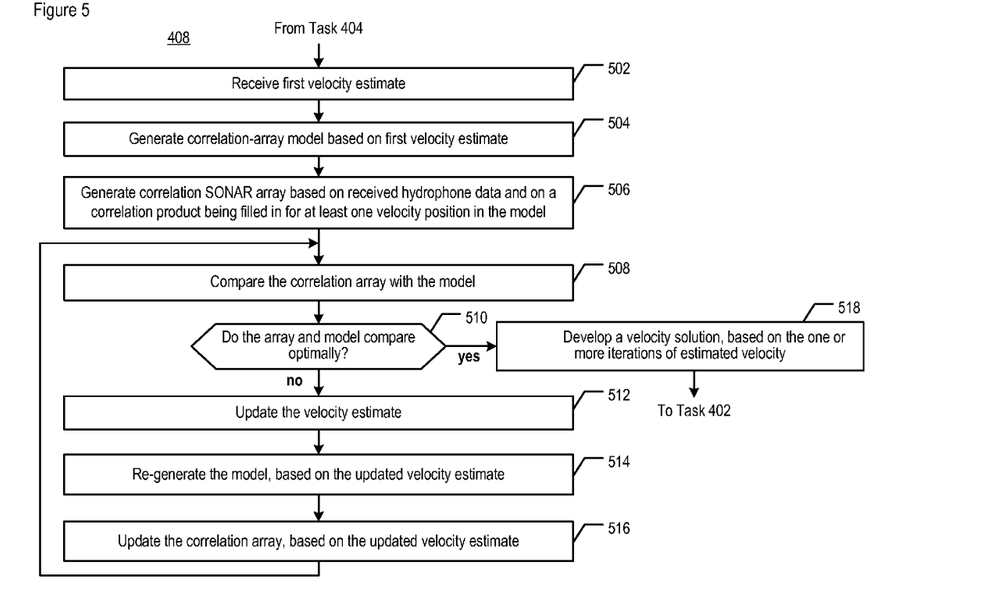
FIG. 5 depicts the salient tasks for velocity-measuring, spatial correlation SONAR processing, in accordance with the illustrative embodiment of the present invention.

FIG. 5 depicts the salient tasks that are associated with task 408 for velocity-measuring, spatial correlation SONAR processing in accordance with the illustrative embodiment of the present invention. As those who are skilled in the art will appreciate, at least some of the tasks depicted in FIG. 5 can be performed simultaneously or in a different order than that depicted.

Figure 6:
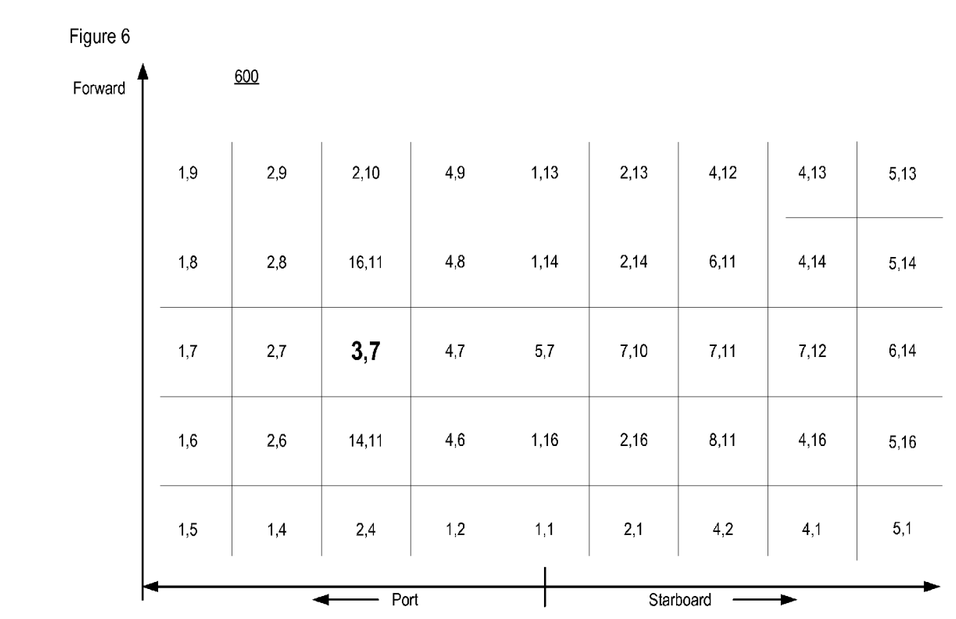
FIG. 6 depicts illustrative channel-selection pair matrix 600, where a different hydrophone pair is represented at each velocity-vector position in the matrix.

Related to the method to be described, FIG. 6 depicts illustrative channel-selection pair matrix 600, where a different receiver pair is represented at each velocity-vector position in the matrix. For example, receiver pair (3,7) corresponds to a velocity vector that is to the forward and port directions, in relation to the ship whose velocity is being determined. For pedagogical purposes, receivers 3 and 15 of receiver array 104 are the receivers detected at task 402 as having failed. In the example, "prime" receiver 3 failed first; as a result, some "back-up receivers" were already deemed necessary to cover for the velocity-vector positions normally covered using receiver 3. The resulting replacement pairs have already been reflected in FIG. 6 (e.g., pair [2,10], etc.).

However, because receiver 15 has now failed in addition to receiver 3, the alternative of using receiver pair (15,11), as illustrated in FIG. 3, for representing the velocity-vector position normally represented by receiver pair (3,7) is no longer available. Therefore, the array element highlighted in FIG. 6 at the velocity-vector position defined by receiver pair (3,7) has to be provided with a substitute array element, such as an estimated correlation product, in accordance with the illustrative embodiment of the present invention.

For pedagogical purposes, it is assumed that two receivers have failed, resulting in a single correlation product being missing from the correlation array. However, after reading this specification, it will be clear to those skilled in the art how to make and use embodiments of the present invention that compensate for a different number of failed receivers (e.g., one, three, etc.) and for multiple, missing correlation product values simultaneously.

At task 502, a first velocity estimate is received from an independent source that does not directly rely on the failed receiver, the receiver array overall, or the SONAR signals received by the array. In accordance with the illustrative embodiment, the velocity estimate is received from an inertial navigator, as is well-known in the art. In some alternative embodiments, the velocity estimate can be received from a Doppler log, as is also known in the art. It will be clear to those skilled in the art how to obtain a velocity estimate from another source that is independent of the failed receiver.

At task 504, a correlation-array model matrix is generated, based on the first velocity estimate. The model can be generated by first knowing the velocity estimate and then working backwards some of the tasks of method 200, in order to arrive at a model of the correlation array that would have resulted in that velocity. The model is also based on the relative positioning of the receivers within receiver array 104. In accordance with the illustrative embodiment, model that corresponds to an entire correlation array of actual SONAR data is generated. However, as those who are skilled in the art will appreciate, after reading this specification, only a subset of the actual correlation array might need to be modeled.

Figure 7:
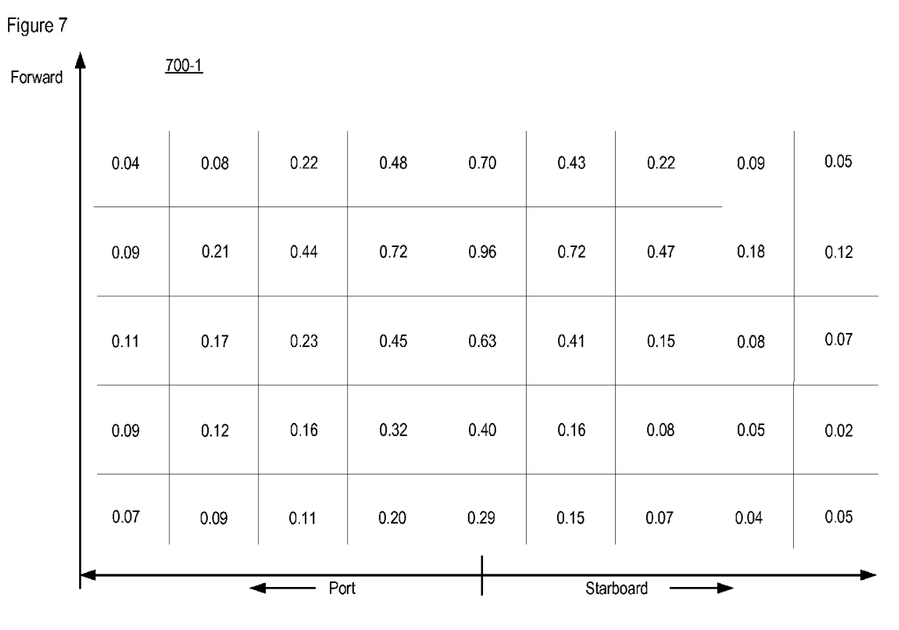
FIG. 7 depicts an example of a first correlation-array model (array model 700-1) that has been generated in accordance with the illustrative embodiment.

An example of a correlation-array model that has been generated in accordance with the illustrative embodiment is depicted in FIG. 7, in which the modeled correlation products are shown at the velocity-vector positions established by the receiver pairs shown in FIG. 6. As illustrated, correlation-array model 700-1 is based on a first velocity estimate that is predominantly in the forward direction, as suggested by the correlation peak value of 0.96 lying directly ahead of the ship and centered with respect to the athwart-ship direction.

At task 506, a correlation SONAR array matrix is generated based on the actual SONAR signals that comprise echo signal information, wherein the signals are received from the receivers in array 104. For example, one or more of tasks 202 through 212 can be used to generate at least some of the correlation product values, in well-known fashion. Correlation array 800-1 is depicted as an example in FIG. 8, in which the correlation products that are based on the actual, received SONAR data are shown at the corresponding velocity-vector positions established by the receiver pairs in FIG. 6. A correlation-product value that corresponds to the faulty velocity-vector position (that is, "0.23" for receiver pair [3,7]) is highlighted, in order to show that it has to be estimated due to the receiver failures. In accordance with the illustrative embodiment the estimated correlation product is directly taken from the corresponding velocity-vector position in correlation-array model 700-1.

Figure 8:
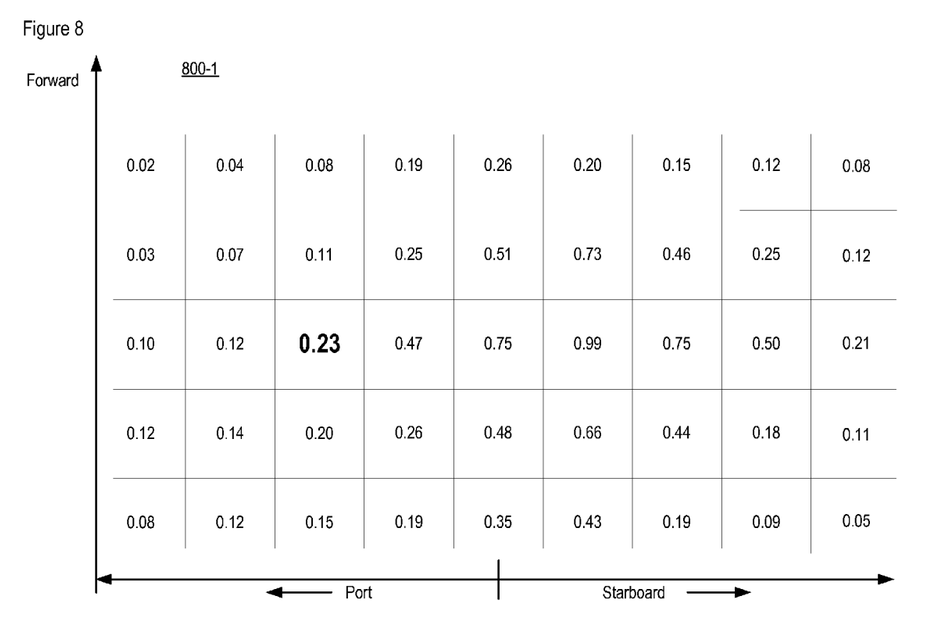
FIG. 8 depicts correlation array 800-1, in which the correlation products that are based on actual, received SONAR data.

In some alternative embodiments, the estimated correlation product can be obtained via means other than by generating a correlation-array model and using the corresponding value from the model. For example, the estimated correlation product can be achieved via interpolating adjacent values and/or other values in correlation array 800-1. In some other alternative embodiments, the estimated correlation product can be developed by a combination of using the corresponding value in correlation array 800-1, as in the illustrative embodiment, and an interpolated value.

Starting with task 508, a revised velocity estimate is developed, based on a difference between the first correlation-array model and the correlation array. At task 508, a matrix-to-matrix comparison is performed, in well-known fashion, resulting in a quantified difference between the two arrays.

At task 510, if the compared arrays compare optimally, task execution proceeds to task 518. Otherwise, task execution proceeds to task 512 to process additional iterations of velocity. For example, the quantified difference being less than a threshold value can constitute an optimal comparison. As another example, the current difference in the current iteration can be compared with one or more previous differences from previous iterations, and a predetermined trend in the differences from one iteration to the next can constitute an optimal comparison between the two arrays. As those who are skilled in the art will appreciate, other methods exist to determine whether the correlation-array model compares favorably with the correlation array of actual SONAR data.

At task 512, which marks the beginning of the next iteration of the velocity determination, a revised velocity estimate is selected. For example, the revised estimate can be based on one or more previous velocity estimates from previous iterations, or it can be chosen randomly within a likely range of velocities, or it can be selected through other means.

At task 514, the correlation-array model is regenerated, similar to how the first correlation-array model was generated at task 504, except that the revised velocity estimate selected at task 512 is used instead.

At task 516, the actual correlation array is updated with a revised, estimated correlation product for the faulty velocity-vector position that is missing the actual correlation product (i.e., corresponding to receiver pair [3,7]).

Figure 9:
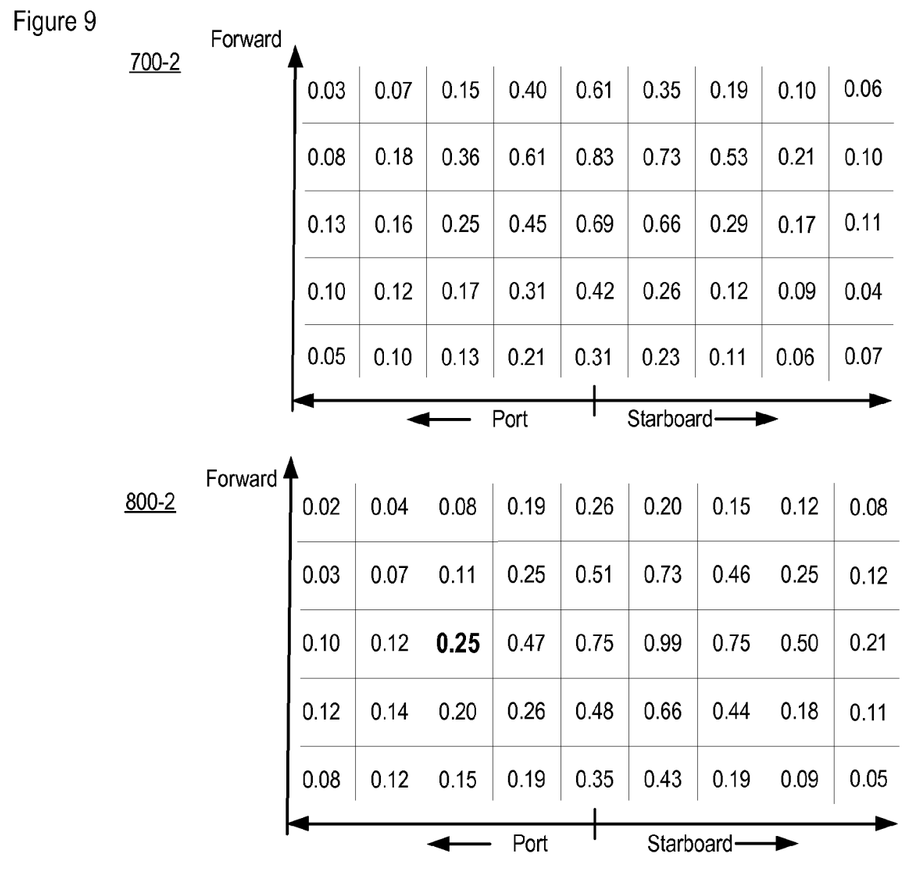
FIG. 9 depicts the first revised iteration of correlation-array model 700 and the first update of correlation array 800, namely array model 700-2 and array 800-2.

The first revised iteration of correlation-array model 700 and the first update of correlation array 800 are depicted in FIG. 9, namely array model 700-2 and array 800-2, respectively. The faulty velocity-vector position has been updated with the revised estimated correlation product (i.e., "0.25"). Additionally, the location of the correlation peak value has moved slightly towards the starboard and the aft directions, which is consistent with the revised velocity estimate being used.

Task execution then proceeds back to task 508, in order to compare the revised correlation-array model and actual correlation array, and also to test additional iterations of the velocity estimate, if needed, before converging on a velocity solution.

Figure 10:
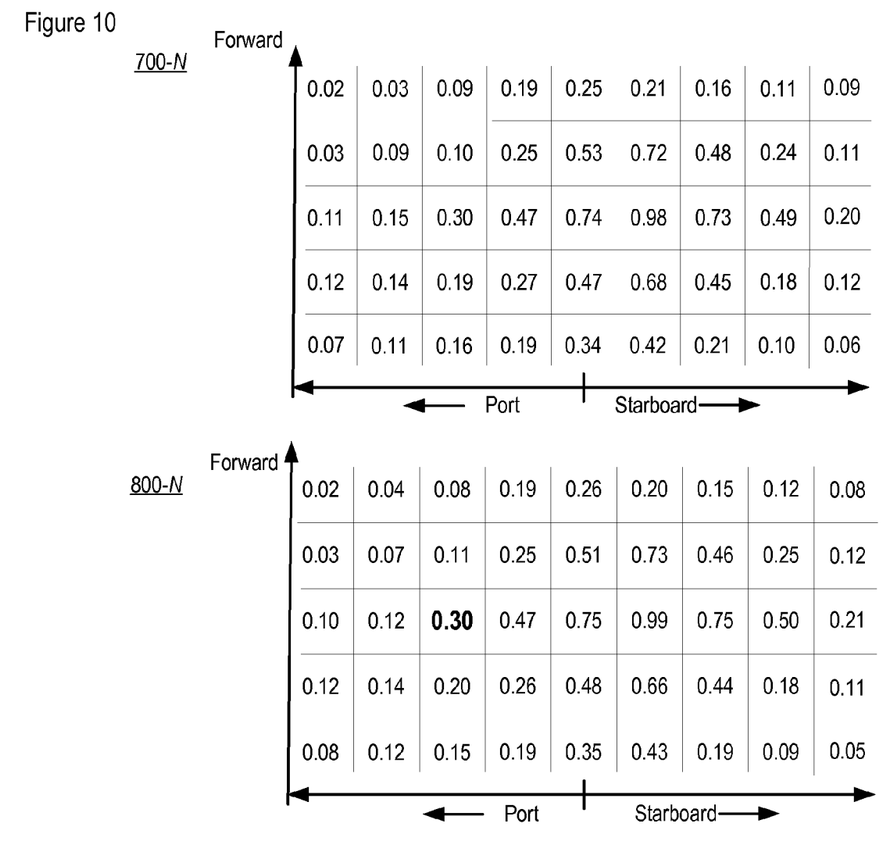
FIG. 10 depicts the final revised iteration of correlation-array model 700 and the final update of correlation array 800, namely array model 700-N and array 800-N.

At task 518, a velocity solution that is a function of the one or more iterations of velocity estimates is developed. FIG. 10 depicts the final revised iteration of correlation-array model 700 and the final update of correlation array 800, namely array model 700-N and array 800-N, respectively. In accordance with the illustrative embodiment, tasks 214 through 218 are performed, using the best correlation array from the iterations on velocity that were just performed, such as the array from the last iteration performed (i.e., array 800-N). In some alternative embodiments, the correlation array that is used in order to perform tasks 214 through 218 is the correlation-array model itself (i.e., array model 700-N), or an array that comprises a weighted average of the correlation product values of the actual array and the array model.

It is to be understood that the disclosure teaches just one example of the illustrative embodiment and that many variations of the invention can easily be devised by those skilled in the art after reading this disclosure and that the scope of the present invention is to be determined by the following claims.

What is claimed is:

1. A method for fault-tolerant processing for a correlation SONAR system, the method comprising:
receiving a first velocity estimate;
generating a first correlation-array model that comprises a first plurality of estimated correlation products that are based on i) the first velocity estimate and ii) the relative positioning of receivers within a plurality of receivers;
generating a correlation array that comprises a plurality of actual correlation products that are based on SONAR signals that are received by the receivers; and
developing a second velocity estimate, based on a difference between i) the first correlation-array model and ii) the correlation array.

2. The method of claim 1 wherein correlation array further comprises one or more substitute array elements that are based on at least one estimated correlation product from the first plurality of estimated correlation products.

3. The method of claim 2 wherein the elements in the correlation array correspond to a plurality of velocity-vector positions defined by receiver pairs within the plurality of receivers, and wherein the velocity-vector position at which a substitute array element is used is based on a receiver that has failed.

4. The method of claim 3 further comprising:
generating a revised correlation-array model that comprises a second plurality of estimated correlation products that are based on the second velocity estimate;
updating the correlation array with at least one estimated correlation product from the second plurality of estimated correlation products; and developing a third velocity estimate, based on a difference between i) the revised correlation-array model and ii) the correlation array that comprises the second correlation product.

5. The method of claim 2 wherein the one or more substitute array elements are also based on an interpolation that involves at least one actual correlation product from the plurality of actual correlation products.

6. The method of claim 1 wherein the first velocity estimate is received from an initial navigator.

7. A method for fault-tolerant processing for a correlation SONAR system, the method comprising:
   detecting that a receiver within a plurality of receivers has failed;
   generating, based on the detection, a first correlation-array model that comprises a first estimated correlation product that is based on i) a first velocity estimate that has been developed independently of the correlation SONAR system and ii) the relative positioning of receivers within the plurality of receivers;
   generating a correlation array that comprises i) at least one actual correlation product that is based on SONAR signals that are received by the receivers and ii) a substitute array element that is based on the first estimated correlation product; and
   developing a second velocity estimate, based on a difference between i) the first correlation-array model and ii) the correlation array.

8. The method of claim 7 further comprising:
   generating a revised correlation-array model that comprises a second estimated correlation product that is based on the second velocity estimate;
   updating the correlation array with the second estimated correlation product; and
   developing a third velocity estimate, based on a difference between i) the revised correlation-array model and ii) the correlation array that comprises the second correlation product.

9. The method of claim 7 further comprising receiving the first velocity estimate prior to the generation of the first correlation-array model.

10. The method of claim 9 wherein the first velocity estimate is received from an initial navigator.

11. The method of claim 7 wherein the elements in the correlation array correspond to a plurality of velocity-vector positions defined by receiver pairs within the plurality of receivers, and wherein the velocity-vector position at which the substitute array element is used is based on the receiver that has failed.

12. The method of claim 11 wherein the receiver that has failed is a back-up hydrophone.

13. The method of claim 7 wherein the substitute array element is also based on an interpolation that involves the at least one actual correlation product.

14. An apparatus comprising:
   a receiver array that comprises a plurality of hydrophones;
   means for developing a first velocity estimate independently of the plurality of hydrophones;
   means for generating
      a) a first correlation-array model that comprises a first estimated correlation product that is based on i) the first velocity estimate and ii) the relative positioning of the hydrophones, and
      b) a correlation array that comprises i) at least one actual correlation product that is based on SONAR signals that are received by the hydrophones and ii) a substitute array element that is based on the first estimated correlation product; and
   means for developing a second velocity estimate, based on a first difference between i) the first correlation-array model and ii) the correlation array.

15. The apparatus of claim 14 further comprising a transmitter that transmits a series of pulses.

16. The apparatus of claim 15 wherein the receiver array is a planar array of sixteen hydrophones for receiving echoes that are based on the transmitted series of pulses.

17. The apparatus of claim 16 further comprising means for detecting that a hydrophone has failed within the planar array, wherein the generation of the first correlation-array model is based on the detection.

18. The apparatus of claim 17 wherein the elements in the correlation array correspond to a plurality of velocity-vector positions defined by pairs of hydrophones in the planar array, and wherein the velocity-vector position at which the substitute array element is used is based on the hydrophone that has failed.

19. The apparatus of claim 18 wherein the planar array comprises prime hydrophones and back-up hydrophones, and wherein the hydrophone that has failed is a back-up hydrophone.

20. The apparatus of claim 14 further comprising means for performing an interpolation that involves the at least one actual correlation product, wherein the substitute array element is also based on the interpolation.

* * * * *

UNITED STATES PATENT AND TRADEMARK OFFICE
CERTIFICATE OF CORRECTION

Page 1 of 1

PATENT NO. : 7,738,318 B2
APPLICATION NO. : 11/945145
DATED : June 15, 2010
INVENTOR(S) : Scoca et al.

It is certified that error appears in the above-identified patent and that said Letters Patent is hereby corrected as shown below:

Insert following the title, in the specification:

--GOVERNMENT INTEREST
This invention was made with Government support under Government Contract Nos. N00030-08-C-0002 and N00030-10-C-0002 awarded by the Department of the Navy. The Government has certain rights in the invention.--

Signed and Sealed this
Third Day of May, 2011

David J. Kappos
*Director of the United States Patent and Trademark Office*